United States Patent
Florkey et al.

(10) Patent No.: US 7,154,999 B2
(45) Date of Patent: Dec. 26, 2006

(54) SENDING IDENTIFICATION INFORMATION OF A PLURALITY OF COMMUNICATION DEVICES THAT ARE ACTIVE ON A COMMUNICATION SESSION TO INFORMATION RECEIVING COMPONENT

(75) Inventors: Cynthia Kae Florkey, Chicago, IL (US); Ruth Schaefer Gayde, Naperville, IL (US); John Richard Rosenberg, Elmhurst, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 302 days.

(21) Appl. No.: 10/685,778

(22) Filed: Oct. 15, 2003

(65) Prior Publication Data

US 2005/0083941 A1  Apr. 21, 2005

(51) Int. Cl.
  *H04M 1/56* (2006.01)
  *H04M 15/06* (2006.01)
  *H04M 3/42* (2006.01)
  *H04L 12/16* (2006.01)

(52) U.S. Cl. .......... 379/142.01; 379/202.01; 379/207.01; 379/207.15; 370/260

(58) Field of Classification Search .......... 379/142.01, 379/142.04, 142.08, 142.13, 142.15, 142.16, 379/142.17, 202.01, 203.01, 204.01, 207.01, 379/207.15, 93.23, 88.19, 88.2, 88.21; 370/259, 370/260, 261, 262, 263, 265, 266, 268, 269; 348/14.08, 14.09

See application file for complete search history.

(56) References Cited

U.S. PATENT DOCUMENTS

| | | | | |
|---|---|---|---|---|
| 5,475,747 A | * | 12/1995 | Bales et al. | 379/202.01 |
| 5,907,604 A | * | 5/1999 | Hsu | 379/142.06 |
| 6,141,406 A | * | 10/2000 | Johnson | 379/189 |
| 6,157,401 A | * | 12/2000 | Wiryaman | 348/14.09 |
| 6,304,648 B1 | * | 10/2001 | Chang | 379/202.01 |
| 6,310,944 B1 | * | 10/2001 | Brisebois et al. | 379/142.01 |
| 6,509,925 B1 | * | 1/2003 | Dermler et al. | 348/14.09 |
| 6,826,159 B1 | * | 11/2004 | Shaffer et al. | 370/260 |
| 6,853,716 B1 | * | 2/2005 | Shaffer et al. | 379/202.01 |
| 2002/0076025 A1 | * | 6/2002 | Liversidge et al. | 379/202.01 |
| 2003/0198329 A1 | * | 10/2003 | McGee | 379/202.01 |

FOREIGN PATENT DOCUMENTS

WO   WO 03/058934   7/2003

OTHER PUBLICATIONS

Miladinovic, et al., SIP Extension for Multiparty Conferencing, Internet Engineering Task Force, Feb. 6, 2001, pp. 1-15, Vienna University of Technology, AUSTRIA.

* cited by examiner

*Primary Examiner*—Quoc Tran

(57) ABSTRACT

An apparatus in one example comprises one or more information sender components that upon engagement of a communication device with a communication session that involves a plurality of communication devices, send to one or more information receiver components identification information of two or more communication devices of the plurality of communication devices and the communication device.

20 Claims, 5 Drawing Sheets

SENDING IDENTIFICATION INFORMATION OF A PLURALITY OF COMMUNICATION DEVICES THAT ARE ACTIVE ON A COMMUNICATION SESSION TO INFORMATION RECEIVING COMPONENT

TECHNICAL FIELD

The invention relates generally to communications and more particularly to identification information exchange in multi-party communication sessions.

BACKGROUND

To initiate a communication session between a calling party communication device and a called party communication device, the calling party communication device sends an invitation to the called party communication device to join the communication session. For example, a calling party telephone calls a called party telephone to initiate a voice conversation. The called party telephone in one example employs a caller identification service to receive identification information of the calling party telephone and/or a user of the calling party telephone. A user of the called party telephone may employ the identification information to decide whether to accept or reject the call.

The calling party telephone in one example is involved in a multi-party communication session prior to inviting the called party telephone to join the multi-party communication session. For example, the calling party telephone is on a conference call with one or more other active communication devices. Upon the calling party telephone calling the called party telephone to join the conference call, the caller identification service indicates to the called party telephone the identification information of the calling party telephone. However, the caller identification service fails to indicate the identification information of the other communication devices active on the conference call to the called party telephone. As one shortcoming, the called party is unaware of the identification information of the other communication devices active on the conference call.

Also, upon addition of the called party telephone to the conference call, the other communication devices active on the conference fail to receive the identification information of the called party telephone. The other communication devices that are active on the conference call in one example receive a notification that a new party has been added to the conference call or a notification that a party has departed the conference call. The notification in one example comprises an audible tone to indicate the addition or departure of a member. As one shortcoming, the other communication devices active on the conference call are unaware of the identification information of the member that has been added to the conference call or the member that has departed the conference call.

Thus, a need exists for an increase in availability of identification information of communication devices in multi-party communication sessions.

SUMMARY

The invention in one implementation encompasses an apparatus. The apparatus comprises one or more information sender components that upon engagement of a communication device with a communication session that involves a plurality of communication devices, send to one or more information receiver components identification information of two or more communication devices of the plurality of communication devices and the communication device.

Another implementation of the invention encompasses an apparatus. The apparatus comprises one or more information sender components that upon a change in connection status of a communication device in a communication session that involves a plurality of communication devices, send to the plurality of communication devices identification information of the communication device.

Yet another implementation of the invention encompasses a method. Identification information of a plurality of communication devices that are active on a communication session is sent to one or more information receiving components, upon a communication device joining or leaving the communication session.

A further implementation of the invention encompasses an article. The article comprises one or more computer-readable signal-bearing media. The article comprises means in the one or more media for sending to one or more information receiving components, identification information of a plurality of communication devices that are active on a communication session upon a communication device joining or leaving the communication session.

DESCRIPTION OF THE DRAWINGS

Features of exemplary implementations of the invention will become apparent from the description, the claims, and the accompanying drawings in which:

DETAILED DESCRIPTION

Figure 1:
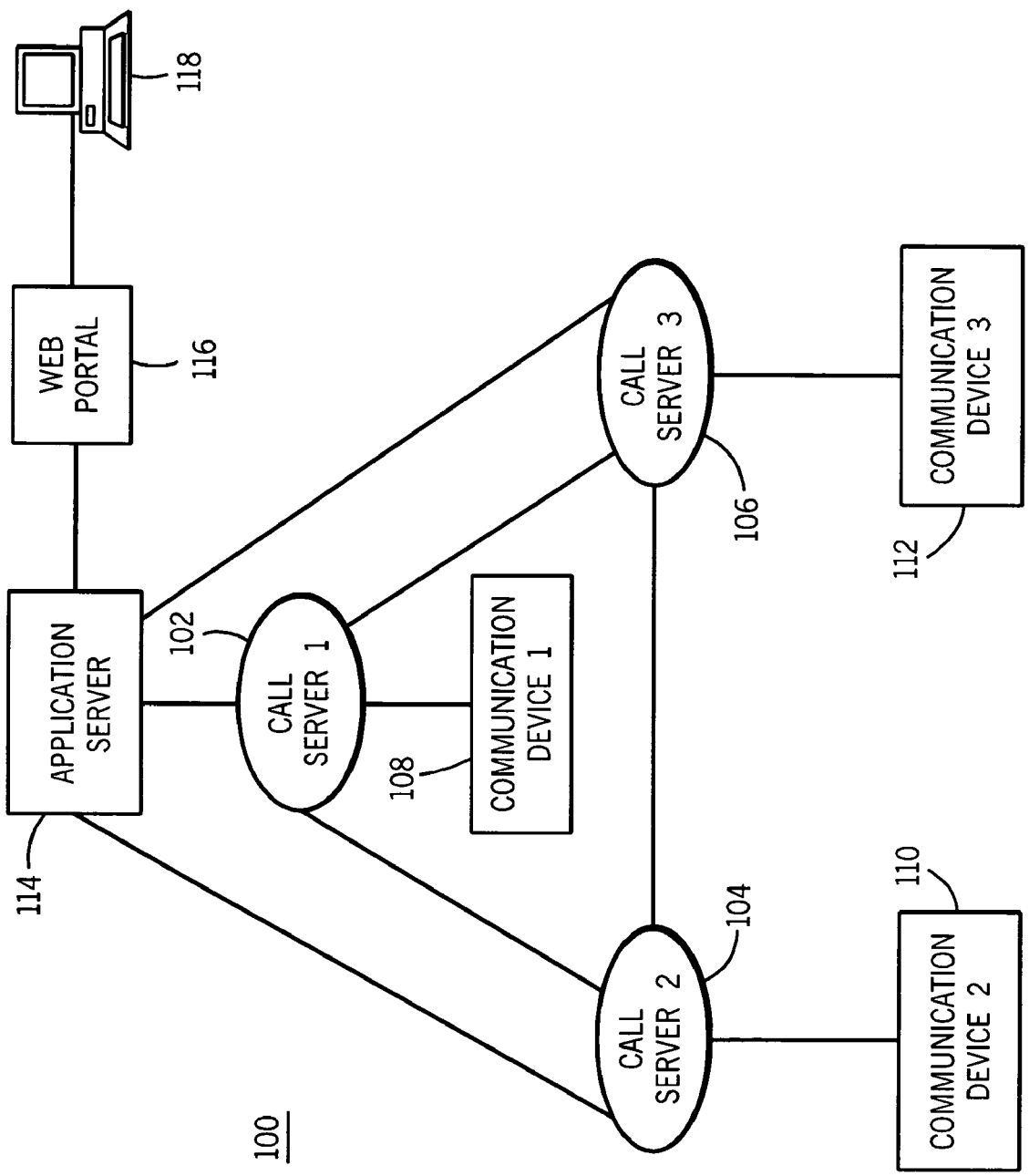
FIG. 1 is a representation of an exemplary implementation of an apparatus that comprises one or more information sender components and one or more information receiver components.

Turning to FIG. 1, an apparatus 100 in one example comprises a plurality of components such as computer software and/or hardware components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

The apparatus 100 in one example comprises one or more information sender components and one or more information receiver components. The information sender components send identification information of one or more communication devices and/or one or more users of the one or more communication devices to the information receiver components. For example, the identification information comprises name information associated with the users of the communication devices, number associated with the communication devices, and presentation information associated with the communication devices.

Exemplary embodiments of the information sender components comprise any one or more of communication session control components 102, 104, and 106 and communication devices 108, 110, and 112. Exemplary embodiments of the information receiver components comprise any one or more of the communication session control components 102, 104, and 106, the communication devices 108, 110, and 112, and an application server 114. For example, a user of the communication device 112 may subscribe to a multi-party caller identification service provided by the information sender components to receive the identification information of all active members of a multi-party communication session.

The communication session control components 102, 104, and 106 ("Call Servers") in one example comprise telecommunication switches that support the communication devices 108, 110, and 112. For example, the communication session control components 102, 104, and 106 may comprise one or more of circuit switches, softswitches, mobile switching centers ("MSCs"), call state control functions ("CSCFs"), serving general packet radio service support nodes ("SGSNs"), and gateway general packet radio service support nodes ("GGSNs"). The communication session control components 102, 104, and 106 may be located within a single network or separated between a plurality of networks. For example, the communication session control components 102 may support the communication device 108 in a first network, the communication session control components 104 may support the communication device 110 in a second network, and the communication session control components 106 may support the communication device 112 in a third network. The plurality of networks may comprise one or more of public switched telephone networks (PSTNs), internets, and intranets.

The communication session control components 102, 104, and 106 connect the communication devices 108, 110, and 112 together on communication sessions or calls. For example, the communication session control component 102 and the communication session control component 104 exchange signaling messages and control the bearer traffic for a call between the communication device 108 and the communication device 110. Then, the communication session control components 102 and 104 deliver portions of the signaling messages and bearer traffic to the respective communication devices 108 and 110. For example, the communication session control components 102 and 104 deliver identification information from the signaling messages and communication information from the bearer traffic to the communication devices 108 and 110.

The communication session control components 102, 104, and 106 comprise one or more call records. The call records store identification information associated with any communication devices that are active on a communication session. During a communication session that actively involves all three of the communication devices 108, 110, and 112, the call records of each of the communication session control components 102, 104, and 106 will store the identification information associated with each of the communication devices 108, 110, and 112. For example, the call record of the communication session control component 102 contains the identification information of each of the communication devices 108, 110, and 112 on the communication session, even if a remote network element added one or more of the communication devices 108, 110, and 112 to the communication session.

The information sender components send call setup messages that carry the identification information associated with the communication devices 108, 110, and 112 that are active on a communication session. The call setup messages in one example may comprise Integrated Services Digital Network ("ISDN") Primary Rate Interface ("PRI"), Session Initiation Protocol ("SIP"), SIP-I, ISDN User Part ("ISUP"), analog, H.323, GR-303, Code Division Multiple Access ("CDMA"), Time Division Multiple Access ("TDMA"), Universal Mobile Telecommunications System ("UMTS"), or Global System for Mobile communications ("GSM") protocols. The call setup messages in one example are capable of carrying the identification information associated with a plurality of communication devices.

In one example, the communication devices 108 and 110 are involved in a communication session and the communication device 110 that is supported by the communication session control component 104 adds the communication device 112 to the communication session. The communication session control component 104 sends the identification information associated with the communication devices 108 and 110 to the communication session control component 106. The communication session control component 106 stores the identification information associated with the communication devices 108 and 110 in its call record.

Upon connection of the communication device 112 with the communication session, the communication session control component 104 updates its call record to include identification information associated with the communication device 112. Then, the communication session control component 104 sends the identification information associated with the communication device 112 to the communication session control component 102 to update the call record of the communication session control component 102. Thus, each of the call records of the communication session control components 102, 104, and 106 store a copy of the identification information of each of the actively involved members of the communication session.

The communication session control components 102, 104, and 106 may then send the identification information of a first one or more of the communication devices 108, 110, and 112 to a second one or more of the communication devices 108, 110, and 112. For example, the communication session control component 102 sends the identification information of the communication devices 110 and 112 to the communication device 108 to indicate to the communication device 108 active involvement of the communication devices 110 and 112 in the communication session. Users of the communication devices 108, 110, and 112 may employ the identification information to determine an active involvement or invitation to join a multi-party communication session and to determine all active communication devices participating in the multi-party communication session.

The information sender components (e.g., one or more of the communication session control components 102, 104, and 106) in one example send multi-party communication session identification information to one or more of the communication devices 108, 110, and 112. The communication devices 108, 110, and 112 in one example comprise one or more of landline telephones, mobile telephones, softphones, personal digital assistants ("PDAs"), and personal computers. The communication devices 108, 110, and 112 present identification information of other communication devices active on a communication session to users of the communication devices 108, 110, and 112. The communication devices 108, 110, and 112 in one example comprise a display to present the identification information of the other communication devices active on a communication session. For example, the display may comprise a display screen, caller identification box, a telephone display, or a popup window. The communication devices 108, 110, and 112 are able to display the identification information associated with a plurality of communication devices and/or users of the communication devices.

The information sender components in one example send multi-party communication session identification information to the application server 114. The application server 114 may comprise one or more of adjunct processors, service control points ("SCPs"), and home location register ("HLRs"). The application server 114 comprises a service provider for one or more of the communication devices 108, 110, and 112. For example, the application server 114 may employ the identification information to provide a service for the communication devices 108, 110, and 112 related to the identification information. The application server 114 interprets the identification information to determine if the identification information effects the provision of a service.

In one example, the communication device 112 requests the application server 114 to block incoming calls that involve a plurality of other communication devices (e.g., the communication devices 108 and 110). Upon receipt of the identification information of the other communication devices, the application server 114 would determine that more than one communication device is involved in the call and therefore could block delivery of the call to the communication device 112. The application server 114 could then play an announcement to the communication devices 108 and 110 actively involved in the call that the communication device 112 does not accept delivery of multi-party calls.

The application server 114 in one example interfaces with a web portal 116. The web portal in one example provides information to a computer 118. The computer 118 in one example is associated with one or more of the communication devices 108, 110, and 112. For example, a user of the communication device 112 employs the computer 118 to receive identification information associated with the communication devices actively involved in a call. The web portal 116 delivers the identification information to the computer 118 and the computer displays the identification information to the user of the communication device 112. The user may then employ the identification information to decide whether to accept or reject the call.

Figure 2:
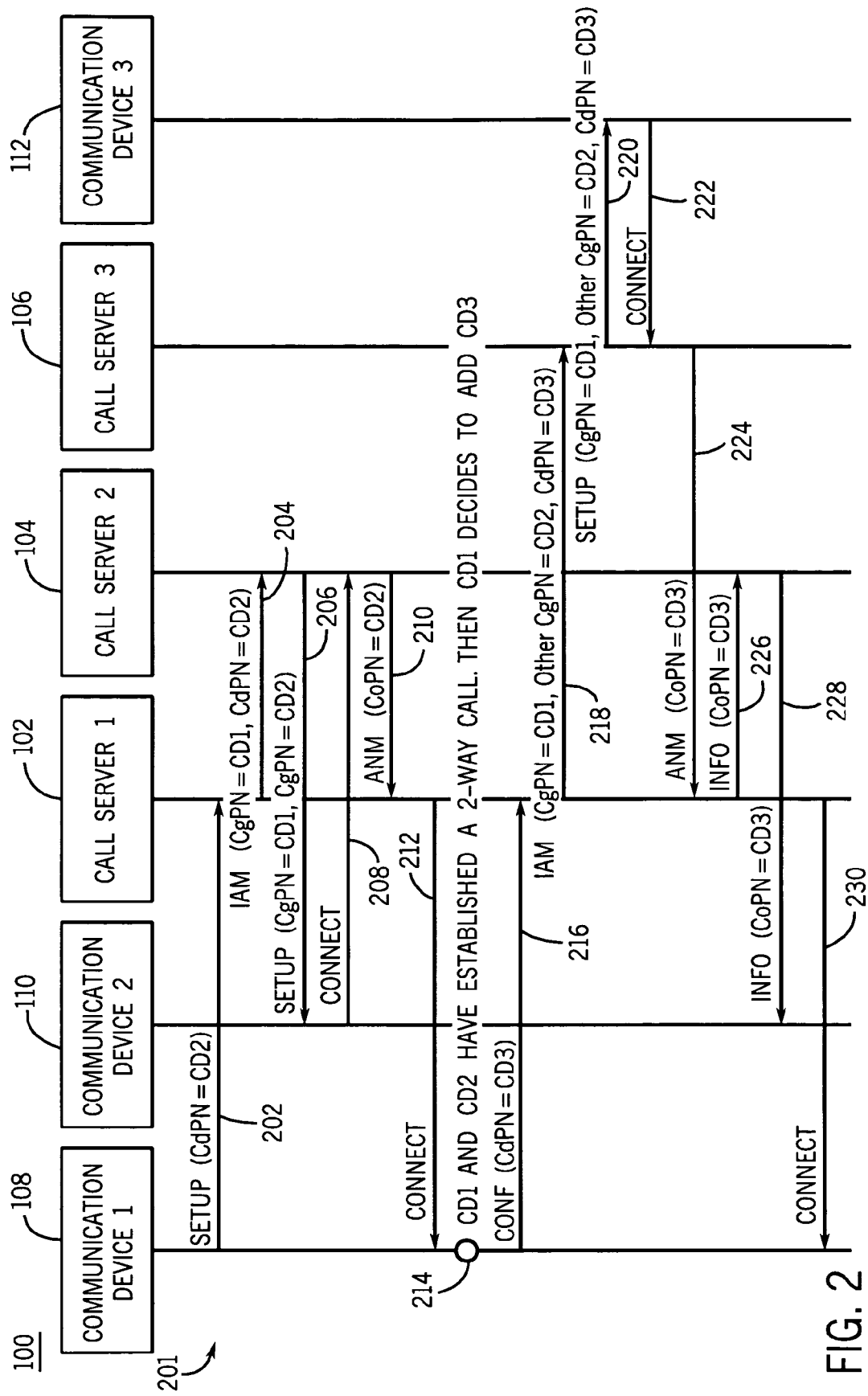
FIGS. 2–4 are representations of exemplary message flows for a delivery of identification information associated with a plurality of communication devices to a communication device of the one or more information receiver components of the apparatus of FIG. 1.

Turning to FIG. 2, an illustrative description of one exemplary operation of the apparatus 100 is now presented, for explanatory purposes. A message flow 201 represents an exemplary connection of the communication device 112 with a communication session that actively involves the communication devices 108 and 110. The message flow 201 illustrates the communication device 108 initiating the invitation of the communication device 112 to join the communication session. The message flow 201 also represents exemplary delivery of identification information of the communication devices 108 and 110 to the communication device 112 prior to acceptance to join the communication session. Users of the communication devices 108, 110, and 112 in one example subscribe to the multi-party caller identification service to receive the identification information of any communication device actively involved in the communication session. The users of the communication devices 108, 110, and 112 in one example have configured and activated the multi-party caller identification service prior to the initiation of the message flow 201.

The message flow 201 illustrates an exemplary use of Integrated Services Digital Network ("ISDN") signaling between one of the communication devices 108, 110, and 112 and a respective one of the communication session control components 102, 104, and 106. Also, the message flow 201 illustrates an exemplary use of ISDN User Part ("ISUP") signaling between the communication session control components 102, 104, and 106. The communication devices 108, 110, and 112 and/or the communication session control components 102, 104, and 106 may communicate using other signaling protocols such as H.323 or Session Initiation Protocol ("SIP").

To initiate the communication session with the communication device 110, the communication device 108 sends a call Setup message 202 to the communication session control component 102. "SETUP (CdPN=CD2)" in one example serves to represent the call Setup message 202. The call Setup message 202 includes the telephone number of the communication device 110. For example, "CdPN=CD2" serves to represent the called party number set to the telephone number of the communication device 110.

Upon receipt of the call Setup message 202, the communication session control component 102 sends an Initial Address Message ("IAM") 204 to the communication session control component 104. The Initial Address Message 204 includes the telephone number of the communication device 110 and the telephone number of the communication device 108. For example, "CgPN=CD1, CdPN=CD2" serves to represent the calling party number set to the telephone number of the communication device 108 and the called party number set to the telephone number of the communication device 110.

Upon receipt of the Initial Address Message 204, the communication session control component 104 sends a call Setup message 206 to the communication device 110. "SETUP (CgPN=CD1, CdPN=CD2)" in one example serves to represent the call Setup message 206. The call Setup message 206 alerts the communication device 110 of the communication session with the communication device 108. The call Setup message 206 includes identification information associated with the communication device 108 and/or the user of the communication device 108. For example, "CgPN=CD1" serves to represent the identification information associated with the communication device 108 and/or the user of the communication device 108.

If the communication device 110 joins the communication session, then the communication device 110 sends a Connect message 208 to the communication session control component 104. Upon receipt of the Connect message 208, the communication session control component 104 sends an Answer Message 210 to the communication session control component 102. "ANM (CoPN=CD2)" serves to represent the Answer Message 210. "CoPN=CD2" serves to represent the connected party number set to the telephone number of the communication device 110. The connected party number also includes a presentation indicator of the communication device 110. For example, the presentation indicator may be set to allow presentation of the identification information associated with the communication device 110. The presentation indicator in one example indicates that the identification information associated with the communication device 110 is unavailable for display, for example, the identification information associated with the communication device 110 is presented as private. The connected party number represents the telephone number of the communication device that connected to the communication session. In one example, if the communication session control component 104 sends the Answer Message 210 before knowledge of the connected party number, then upon determination of the connected party number the communication session control component 104 sends the connected party number to the communication session control component 102 in a separate Information Message.

Upon receipt of the Answer Message 210, the communication session control component 102 sends a connect message 212 to the communication device 108. The Connect message 212 indicates to the communication device 108 that the communication device has joined the communication session. Then, the communication device 108 and the communication device 110 begin communication in a two-way call 214.

The user of the communication device 108 in one example decides to invite the communication device 112 to join the communication session. For example, the user of the communication device 108 changes the two-way call 214 into a three-way call or conference call. To initiate the invitation of the communication device 112 to join the communication session, the communication device 108 sends a Conference message 216 to the communication session control component 102. "CONF(CdPN=CD3)" serves to represent the Conference message 216. "CdPN=CD3" serves to represent the called party number, for example the telephone number of the communication device 112. The Conference message 216 in one example comprises a feature button indication message that directs the communication session control component 102 to conference in the communication device 112.

Upon receipt of the Conference message 216, the communication session control component 102 sends an Initial Address Message ("IAM") 218 to the communication session control component 106. The Initial Address Message 218 includes the telephone number of the communication device 108, the telephone number of the communication device 110, and the telephone number of the communication device 112. For example, "CgPN=CD1, Other CgPN=CD2, CdPN=CD3" serves to represent the calling party number set to the telephone number of the communication device 108, the other calling party number set to the telephone number of the communication device 110, and the called party number set to the telephone number of the communication device 112. The communication session control component 102 determines the other calling party number from information received in the Answer Message 210.

If the identification information of the communication device 110 is unavailable to the communication session control component 102, then the communication session control component 102 sets the other calling party number to unknown, for example "Other CgPN=Unknown." Setting the other calling party number to unknown alerts the user of the communication device 112 that another party is active on the call, but the identification information of the party is unavailable.

To deliver the call to the communication device, the communication session control component 106 sends a Setup message 220 to the communication device 112. The Setup message 220 includes the identification information associated with the communication devices 108 and 110. The identification information associated with both the communication devices 108 and 110 indicates to a user of the communication device 112 that more than one communication devices are active on the communication session.

If the communication device 112 joins the communication session, then the communication device 112 sends a Connect message 222 to the communication session control component 106. Upon receipt of the Connect message 222, the communication session control component 106 sends an Answer Message 224 to the communication session control component 102. "ANM (CoPN=CD3)" serves to represent the Answer Message 224. "CoPN=CD3" serves to represent the connected party number set to the telephone number of the communication device 112.

Upon receipt of the Answer Message 224, the communication session control component 102 sends an Information Message 226 to the communication session control component 104. The Information Message 226 includes the identification information associated with the communication device 112. Once the communication session control component 104 receives the Information Message 226, then both of the communication session control components 102 and 104 have a complete list of the identification information associated with the parties (e.g., the communication devices 108, 110, and 112) that are active on the communication session. For example, if one of the communication session control components 102 and 104 invites an additional communication device to the communication session, then the communication session control components 102 and 104 are able to present the complete list of the identification information to the additional communication device.

The communication session control component 104 passes the identification information associated with the communication device 112 to the communication device 110 in an Information Message 228. The Information Message 228 alerts the user of the communication device 110 that the communication device 112 has joined the communication session. The Information Message 228 also presents the identification information associated with the communication device 112 to the user of the communication device 110.

The communication session control component 102 sends a Connect message 230 to the communication device 108. The Connect message 230 indicates to the communication device 108 that the communication device 112 has joined the communication session. The communication session control component 102 may send the Connect message 230 anytime after receipt of the Answer Message 224.

Figure 3:
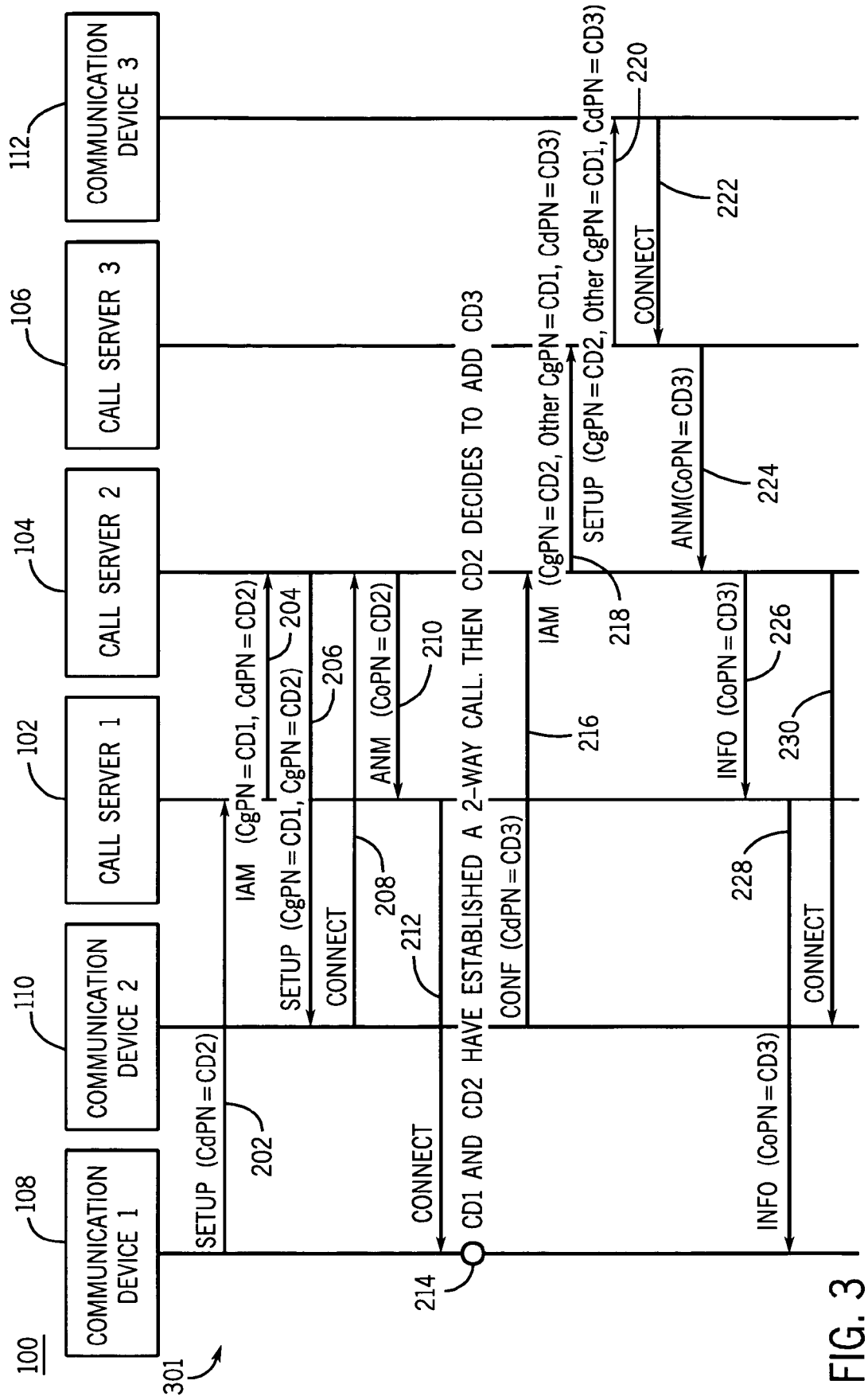

Turning to FIG. 3, an illustrative description of another exemplary operation of the apparatus 100 is now presented, for explanatory purposes. A message flow 301 represents an exemplary connection of the communication device 112 with a communication session that actively involves the communication devices 108 and 110. The communication devices 108 and 110 set up the two-way call 214 as described in the message flow 201. The message flow 301 is analogous to the message flow 201. However, the message flow 301 illustrates the communication device 110 initiating the invitation of the communication device 112 to join the communication session. For example, the communication device 110 sends the Conference message 216 to the communication session control component 104 to initiate the invitation to the communication device 112.

In the message flow 301, the Initial Address Message 218 comprises an indication that the communication device 110 initiated the invitation and that the communication device 108 is active on the communication session. For example, "CgPN=CD2, Other CgPN=CD1, CdPN=CD3" serves to represent the calling party number set to the telephone number of the communication device 110, the other calling party number set to the telephone number of the communication device 108, and the called party number set to the telephone number of the communication device 112. The communication session control component 104 determines the other calling party number from information received in the Initial address message 204.

Upon connection of the communication device 112 to the communication session, the communication session control component 106 sends the Answer Message 224 to the communication session control component 104. Then, the communication session control component 104 sends the Information Message 226 to the communication session control component 102. The communication session control component 102 sends the Information Message 228 to the communication device 108 to provide the identification information of the communication device 112 to the user of the communication device 108. The communication session control component 104 sends the Connect message 230 to the communication device 110 to indicate to the communication device 110 that the communication device 112 has joined the communication session.

In one example, the communication session control component 104 sends the Connect message 230 after sending the Information Message 226. In another example, the communication session control component 104 sends the Information Message 226 after sending the Connect message 230. In both examples, the communication session control component 102 sends the Information Message 228 after receipt of the Information Message 226.

Figure 4:
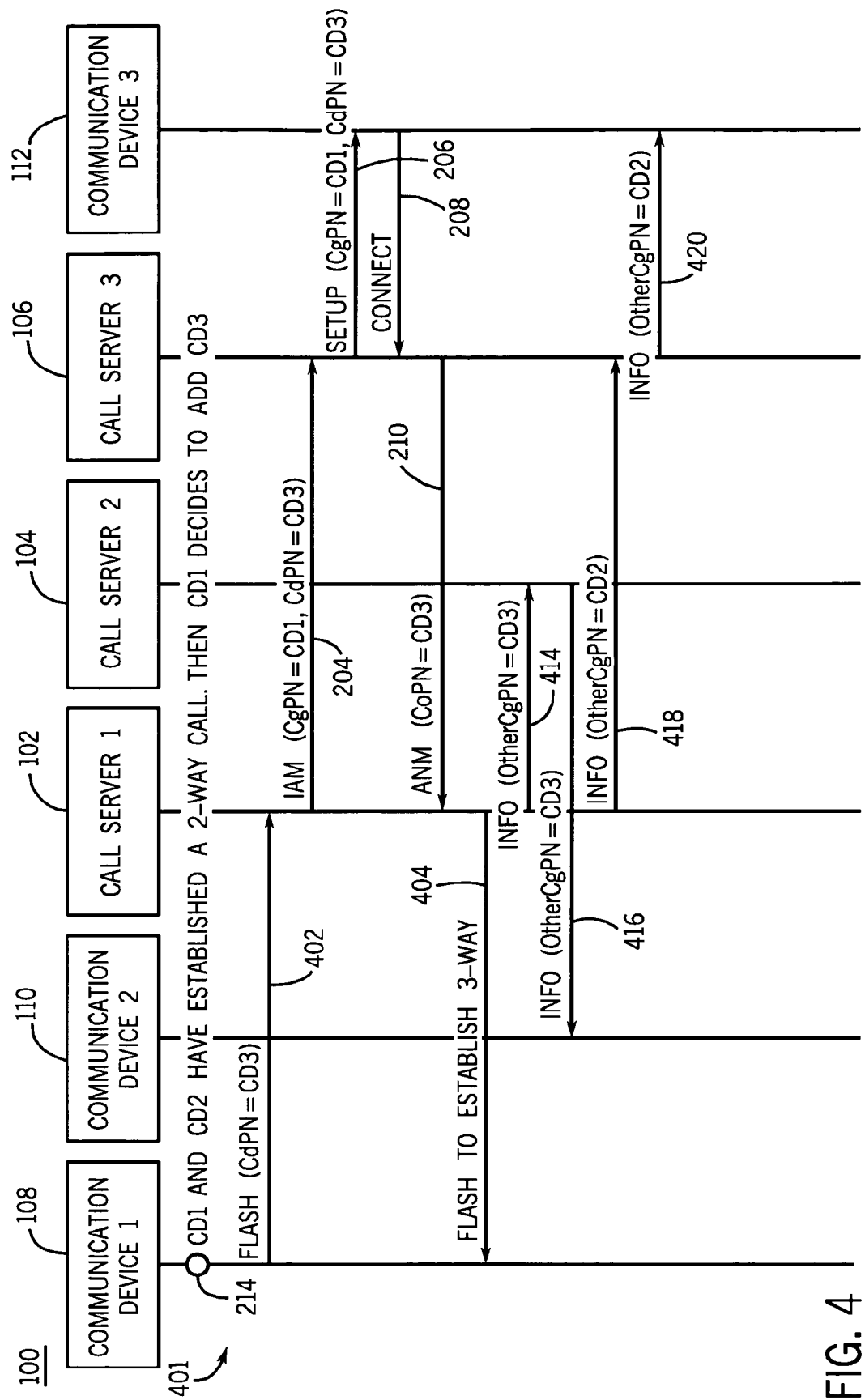

Turning to FIG. 4, an illustrative description of yet another exemplary operation of the apparatus 100 is now presented, for explanatory purposes. A message flow 401 represents an exemplary connection of the communication device 112 with a communication session that actively involves the communication devices 108 and 110. The message flow 401 illustrates the communication device 108 separately inviting the communication devices 110 and 112 to join the communication session and then joining all three of the communication devices 108, 110, and 112 on the communication session.

The message flow 401 illustrates an exemplary use of analog signaling between one of the communication devices 108, 110, and 112 and a respective one of the communication session control components 102, 104, and 106. Also, as shown in the message flows 201 and 310, the message flow 401 illustrates an exemplary use of ISUP signaling between the communication session control components 102, 104, and 106. The communication devices 108, 110, and 112 and/or the communication session control components 102, 104, and 106 may communicate using other signaling protocols such as H.323, SIP, Global System for Mobile Communications ("GSM"), Interim Standard-95 ("IS-95"), Universal Mobile Telecommunications System ("UMTS"), and Time Division Multiple Access ("TDMA").

The communication devices 108 and 110 are active in the two-way call 214, as described in the message flow 201. To initiate the addition of the communication device 112 to the communication session (e.g., the two-way call 214), the communication device sends a flash message 402 to the communication session control component 102. Then, the communication device 108 dials the telephone number of the communication device 112. "FLASH (CdPN=CD3)" serves to represent the flash message 402. "CdPN=CD3" serves to represent the telephone number of the communication device 112. The flash message 402 in one example does not indicate to the communication session control component 102 that the call comprises a multi-party call.

Upon receipt of the flash message 402, the communication session control component 102 sends the Initial Address Message 204 to the communication session control component 106. The Initial Address Message 204 comprises the identification information associated with the communication device 108 and the telephone number associated with the communication device 112. The Initial Address Message 204 in one example does not include the identification information associated with the communication device 110 because a multi-party conference has yet to be established to connect the communication devices 110 and 112.

Upon receipt of the Initial Address Message 204, the communication session control component 106 sends the Setup message 206 to the communication device 112. The Setup message 206 comprises the identification information of the calling party (e.g., the communication device 108). Upon answering the call, the communication device sends the Connect message 208 to the communication session control component 106. The communication session control component 106 sends the Answer Message 210 to the communication session control component 102. The Answer Message 210 comprises the identification information associated with the communication device 112 such as the connected party number of the communication device 112.

The communication device 108 sends a flash message 404 to the communication session control component 102. The flash message 404 serves to establish a three-way call between the communication devices 108, 110, and 112. For example, the flash message 404 triggers the communication session control component 102 to join the two-way call 114 between the communication devices 108 and 110 with the two-way call between the communication devices 108 and 112. Therefore, the communication devices 108, 110, and 112 are actively involved in the three-way call.

Upon establishment of the three-way call, the communication session control component 102 notifies the communication session control component 104 of the identification information associated with the communication device 112. For example, the communication session control component 102 sends an Information Message 414 to the communication session control component 104 to indicate that the communication device 112 has joined the call. The communication session control component 104 then presents the identification information of the communication device 112 in an Information Message 416 to the communication device 110.

Also, the communication session control component 102 notifies the communication session control component 106 of the identification information associated with the communication device 110. For example, the communication session control component 102 sends an Information Message 418 to the communication session control component 106 to indicate that the communication device 110 has joined the call. The communication session control component 104 then presents the identification information of the communication device 110 in an Information Message 420 to the communication device 112.

Figure 5:
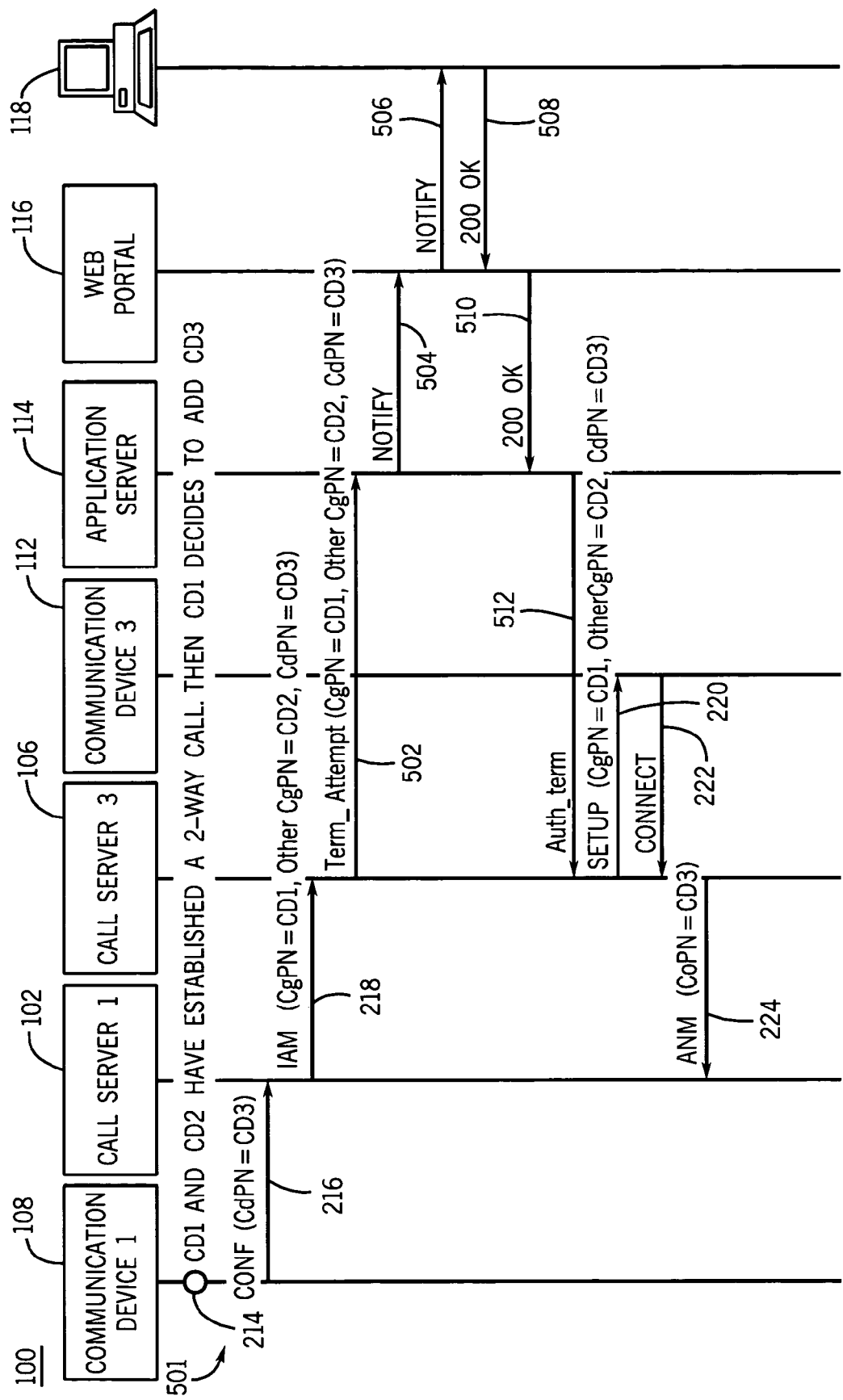
FIG. 5 is a representation of one exemplary message flow for a delivery of identification information associated with a plurality of communication devices to an application server of the one or more information receiver components of the apparatus of FIG. 1.

Turning to FIG. 5, an illustrative description of still another exemplary operation of the apparatus 100 is now presented, for explanatory purposes. A message flow 501 represents an exemplary connection of the communication device 112 with a communication session that actively involves the communication devices 108 and 110. The message flow 501 also illustrates a delivery of identification information of the communication devices 108, 110, and 112 to the application server 114.

The message flow 501 illustrates an exemplary use of Advanced Intelligent Network ("AIN") signaling between the communication session control components 102, 104, and 106. Also, the message flow 501 illustrates an exemplary use of SIP subscribe/notify signaling between the application server 114, the web portal 116, and the computer 118.

The communication devices 108 and 110 are active in the two-way call 214, as described in the message flow 201. To initiate the addition of the communication device 112 to the communication session, the communication device sends the Conference message 216 to the communication session control component 102 and in response the communication session control components 102 sends the Initial Address Message 218 to the communication session control components 106, as described in the message flow 201.

The Initial Address Message 218 in one example activates a trigger in the communication session control components 106. The trigger indicates to the communication session control components 106 to send the identification information of the communication devices 108, 110, and 112 that are active on the call. In one example, the communication session control component 106 sends a Termination Attempt Query 502 to the application server 114. In another example, the communication session control component 106 sends a wireless intelligent network ("WIN") query to the application server.

The application server may employ the identification information of the communication devices 108, 110, and 112 to provide a service to one or more of the communication devices 108, 110, and 112. In one example, the application server 114 interacts with the web portal 116 and the computer 118. For example, the application server 114 sends a Notify Message 504 to the web portal 116. The Notify Message 504 comprises an indication that the call is for the communication device 112 and presents the identification information associated with the communication devices 108 and 110.

Upon receipt of the Notify message 504, the web portal 116 sends a Notify message 506 to the computer 118. The Notify message 506 comprises the indication that the call for the communication device 112 and the identification information associated with the communication devices 108 and 110. The computer 118 in one example displays the identification information associated with the communication devices 108 and 110 for the user of the communication device 112. The computer 118 sends an Acknowledgement message 508 to the web portal 116 to indicate receipt of the nNotify message 506. "200 OK" serves to represent the acknowledgement message 508. The web portal 116 sends an acknowledgement message 510 to the application server to indicate receipt of the Notify message 504. "200 OK" serves to represent the acknowledgement message 510. In one example, the computer 118 sends the acknowledgement message 508 before the web portal 116 sends the acknowledgement message 510. In another example, the web portal 116 sends the acknowledgement message 510 before the computer 118 sends the acknowledgement message 508.

Upon receipt of the acknowledgement message 510, the application server 114 sends an authorization message 512 to the communication session control components 106 indicating to the communication session control components 106 to connect the call to the communication device 112. "Auth_Term" in one example serves to represent the authorization message 512. The communication session control components 106 then serves to connect the communication device 112 with the communication session with the transmission of the Setup message 220, receipt of the Connect message 222, and transmission of the Answer Message 224 to the communication session control components 102, as described in the message flow 201.

The apparatus 100 in one example employs one or more computer-readable signal-bearing media. One example of a computer-readable signal-bearing medium for the apparatus 100 comprises one or more instances of the recordable data storage medium of one or more of the communication session control components 102, 104, and 106. For example, the recordable data storage medium comprises one or more of a magnetic, electrical, optical, biological, and atomic data storage medium. In another example, a computer-readable signal-bearing medium for the apparatus 100 comprises a modulated carrier signal transmitted over a network comprising or coupled with the apparatus 100, for instance, one or more of a telephone network, a local area network ("LAN"), the internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
   a first communication session control component that supports a first communication device on a communication session with a second communication device; and
   a second communication session control component that supports the second communication device on the communication session;
   wherein the first communication session control component stores a first call record that contains identification information of the first and second communication devices that are active on the communication session, and wherein the second communication session control component stores a second call record that contains the identification information of the first and second communication devices that are active on the communication session;
   wherein the first communication session control component sends the identification information of the first and second communication devices to a third communication session control component that supports a third communication device to invite the third communication device to join the communication session; and
   wherein if the third communication device joins the communication session, the first communication session control component adds identification information of the third communication device to the first call record and sends the identification information of the third communication device to the second communication session control component; and
   wherein upon receipt of the identification information of the third communication device from the first communication session control component, the second communication session control component adds the identification information of the third communication device to the second call record; and
   wherein if the identification information of the second communication device is unavailable to the first communication session control component, then the first communication session control component sets a telephone number for the second communication device to unknown to alert a user of the third communication device that the second communication device is active on the communications session.

2. The apparatus of claim 1, wherein upon receipt of an indication that the third communication device has joined the comumunictation session, the first communication session control component sends the identification information of the third communication device to the first communication device and the second communication session control component; and wherein upon receipt of the identification information of the third communication device from the first communication session control component, the second communication session control component sends the identification information of the third communication device to the second communication device.

3. The apparatus of claim 1, wherein to invite the third communication device to the communication session, the first communication session control component sends identification information of all communication devices that are active on the communication session to the third communication session control component.

4. The apparatus of claim 1, wherein the first communication session control component indicates to the third communication session control component which of the first and second communication devices invited the third communication device to join the communication session; and wherein the third communication session control component indicates to the third communication device which of the first communication device and the second communication device invited the third communication device to join the communication session.

5. The apparatus of claim 1, wherein the identification information of the first and second communication devices comprises:

name information associated wit one or more users of the first and second communication devices;

number information associated with the first and second communication devices; and presentation information associated with the first and second communication devices.

6. The apparatus of claim 5, wherein the third communication session control component sends the name information and the number information to the third communication device in a communication session Setup message.

7. The apparatus of claim 1, wherein the first communication session control component comprises a first telecommunication switch that supports the first communication device, and wherein the third communication session control component comprises a third telecommunication switch that supports the third communication device; and wherein the first telecommunication switch sends the identification infonnation of the first and second communication devices to the third telecommunication switch.

8. The apparatus of claim 7 in combination with the third telecommunication switch, wherein the third telecommunication switch delivers the identification information of the first and second communication devices to the third communication device; and wherein a user of the third communication device may employ the identification information of the first and second communication devices to make a determination whether to join the communication session.

9. The apparatus of claim 1 further comprising an application server, wherein the first communication session control component send the identification information of the first and second communication devices to the third communication session control component, and wherein the third communication session control component sends the identification information of the first and second communication devices to the application server; and wherein the application server employs the identification information of the first and second communication devices to provide a service to the third communication device.

10. The apparatus of claim 1, wherein upon departure of a communication device from the communication session, a session control component that supports the communication device involved in the departure notifies the first communication session control component of the departure; and wherein the first communication session control component sends identification information of the communication device involved in the departure to the first communication device.

11. The apparatus of claim 1 in combination with the third communication session control component, and wherein the third communication session control component creates a third call record to store identification information of communication devices that are active on the communication session; and wherein the third communication session control component store the identification information of the first and second communication devices in the third call record.

12. An apparatus, comprising:

a first communication session control component that supports a first communication device on a communication session with a second communication advice and a third communication device; and a second communication session control component that supports the second communication device on the communication session;

wherein the second communication session control component stores a call record that contains identification information of communication devices that are active on the communication session; and wherein upon departure of the first communication device from the communication session, the first communication session control component notifies the second communication session control component of the departure; and wherein the second communication session control component removes the identification information of the first communication device from the call record and sends the identification information of the first communication device involved the departure to the second communication device;

the apparatus further comprising a third communication session control component that supports the third communication device on the communication session, wherein the call record comprises a first call record, and wherein the third communication, session control component stores a second call record that contains identificatioL information of communication devices that are active on the communication session; and wherein if the identification information of the second communication device is unavailable to the first communication session control component, then the first communication session control component sets a teleDhofle number for the second communication device to unknown to alert a user of the third communication device that the second communication device is active on the communications session.

13. The apparatus of claim 12,
wherein upon departure of the first communication device from tihe communication session, the first communication session control component notifies the third communication session control component of the departure; and
wherein the third communication session control component removes the identification information of the first communication device from the second call record and sends the identification information of the first communication device involved in the departure to the third communication device.

14. The apparatus of claim 12, wherein the first communication session control component comprises a first telecommunications switch, and wherein the second communication session control component comprises a second telecommunications switch; and
wherein the first telecommunications switch sends the identification information of the first communication device to the second telecommunications switch tt indicate that the first communication device has left the communication session.

15. A method, comprising the steps of:
creating a first call record at a first communication session control component that supports a first communication device on a communication session with a second communication device, wherein the first call record contains identificatitn information of communication devices that are active on the communication session;
creating a second call record at a second communication session control component that supports the second communication device on the communication session, wherein the second call record contains identification information of communication devices that are active on the communication session;
sending identification information of the first and second communication devices from the first communication session control component to a third communication session control component that supports a third communication device to invite the third communication device to join the communication session;
creating a third call record at the third communication session control component to store the identification information of the first and second communication devices that are active on the communication session; and
sending the identification information of the first and second communication devices from the third communication session control component to the third communication device to allow a user of the third communication device to employ the identification information of the first and second communication devices to make a determination whether to join the communication session;
wherein if the identification information of the second communication device is unavailable to the first communicaton session control component, then the first communication session control component sets a telephone number for the second communication device to unknown to alert a user of the third communication device that the second communication device is active on the communications session.

16. The method of claim 15, further comprising the steps of:
sending an indication that the third communication device has joined the communication session from the third communication session control component to the first communication session control component;
adding identification information of the third communication device to the first call record at the first communication session control component; and
sending the identification information of the third communication device from the first communication session control component to the first communication device to indicate to a user of the first communication device that the third communication device has joined the communication session.

17. The method of claim 16, further comprisng the steps of:
sending the identification information of the third communication device from the first communication session control component to the second communication on session control component to indicate that the third communication device has joined communication session;
adding the identification information of the third communication device to the second call record at the second communication session control component; and
sending the identification information of the third communication device from the second communication session control component to the second communication device to indicate to a user of the second communication device that the third communication device has joined the communication session.

18. The method of claim 17, further comprising the steps of:
sending a departure notification from the third communication session control component to the first and second communication session control components upon departure of the third communication device from the communication session;
removing the identification information of the third communication device from the first call record at the first communication session control component;
removing the identification information of the third communication device from the second call record at the second communication session control component;
sending the identification information of the third communication device involved in the departure from the first communication session control component to the first communication device to indicate to the user of the first communication device that the third communication device has left the conimunication session; and
sending the identification information of the third communication device involved in the departure from the second communication session control component to the second communication device to indicate to the user of the second communication device that the third communication device has left the communication session.

19. The method of claim 15, further comprising the step of:
sending the identification information of the first and second communication devices from the third communication session control component to an application server upon receipt of the identification information of the first and second communication devices from the first communication session control component, wherein the application server employs the identification information of first and second communication devices to provide a service to a user of the third communication device.

20. An article, comprising:

one or more computer-readable signal-bearing media;

means in the one or more media for creating a first call record at a first communication session control component that supports a first communication device on a communication session with a second communication device, wherein the first call record contains identification information of communication devices that are active on the communication session;

means in the one or more media for creating a second call record at a second communication session control component that supports the second communication device on the communication session, wherein the second call record contains identification information of communication devices that are active on the communication session;

means in the one or more media for sending identification information of the first and second communication devices from the first communication session component to a third communication session control component that supports a third communication device to invite the third communication device to join the communication session;

means in the one or more media for creating a third call record at the third communication session control component to store the identification information of the first and second communication devices that are active on the communication session; and means in the one or more media for sending the identification information of the first and second communication devices from the third communication session control component to the third communication device to allow a user of the third coniniubication device to employ the identification information of the first and second communication devices to make a determination whether to join the communication session;

wherein if the identification information of the second commuication device is unavailable to the first communication session control component then the first communication session control component sets a telephone number for the second communication device to unknown to alert a user of the third communication device that the second communication device is active on the communications session.

* * * * *